US008363844B2

(12) United States Patent
Winter

(10) Patent No.: US 8,363,844 B2
(45) Date of Patent: Jan. 29, 2013

(54) CONTEXTUAL AUDIO SWITCHING FOR A USB CONTROLLED AUDIO DEVICE

(75) Inventor: Richard M Winter, Bristol (GB)

(73) Assignee: Plantronics, Inc., Santa Cruz, CA (US)

( * ) Notice: Subject to any disclaimer, the term of this patent is extended or adjusted under 35 U.S.C. 154(b) by 831 days.

(21) Appl. No.: 12/343,934

(22) Filed: Dec. 24, 2008

(65) Prior Publication Data

US 2010/0158288 A1 Jun. 24, 2010

(51) Int. Cl.
*H04B 3/00* (2006.01)
*H04R 5/02* (2006.01)

(52) U.S. Cl. .......... 381/81; 361/123; 361/119; 361/309; 361/311

(58) Field of Classification Search .................... 381/81, 381/119, 311
See application file for complete search history.

(56) References Cited

U.S. PATENT DOCUMENTS 7,272,232 B1 * 9/2007 Donaldson et al. ............. 381/55
2006/0067491 A1 * 3/2006 Sato et al. ................ 379/101.01
2007/0123171 A1 * 5/2007 Slamka et al. ............... 455/66.1
2007/0217396 A1 * 9/2007 Su ................................ 370/352

* cited by examiner

*Primary Examiner* — S. V. Clark
*Assistant Examiner* — Jesse Y Miyoshi
(74) *Attorney, Agent, or Firm* — Chuang Intellectual Property Law

(57) ABSTRACT

Systems and methods for contextual audio switching for a USB controlled audio device coupled to a processor-based host are presented. Two or more USB audio endpoints associated with a singular output audio transducer or transducer set are declared at the USB controlled audio device. The two or more USB audio endpoints are monitored to identify an audio signal presence at the two or more USB audio endpoints. A priority audio signal may be determined responsive to identifying the audio signal presence at two or more USB audio endpoints.

21 Claims, 5 Drawing Sheets

CONTEXTUAL AUDIO SWITCHING FOR A USB CONTROLLED AUDIO DEVICE

BACKGROUND OF THE INVENTION

FIG. 1 illustrates routing of audio signals in a USB audio device 112 coupled to a personal computer in the prior art. The USB audio device 112 having a USB port 114 is coupled to a PC 102 having a USB port 110. When the USB port 114 is mated with USB port 110, enumeration of USB audio device 112 occurs.

The host device, PC 102, detects the attachment of USB audio device 112. During enumeration, PC 102 sends control transfers containing standard USB requests to the USB audio device 112. The USB audio device 112 must respond to each request by returning requested information and taking any requested actions. The firmware of USB audio device 112 may contain the information PC 102 requests, and a combination of hardware and firmware may respond to request for the information. During enumeration, the USB audio device 112 moves through four states: Powered, Default, Address, and Configured.

During the enumeration process, the USB audio device 112 defines a series of its capabilities, including its number of USB audio endpoints. In the prior art, a single USB audio endpoint is declared for each audio transducer or transducer set at the USB audio device 112. For example, a USB audio device 112 having an audio transducer consisting of a microphone and an audio transducer set consisting of a speaker pair will declare two USB audio endpoints during enumeration. One USB audio endpoint is declared for the microphone (i.e., an "audio input endpoint" or "input audio endpoint") and one USB audio endpoint is declared for the speaker pair (i.e., an "audio output endpoint" or "output audio endpoint").

In the prior art, a user of USB audio device 112 may simultaneously hear audio output from different applications being executed on PC 102. Listening to audio from multiple applications simultaneously may be undesirable to the user in many cases.

As a result, there is a need for improved methods and apparatuses for audio routing and switching in USB audio devices.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for contextual audio switching for a USB controlled audio device are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
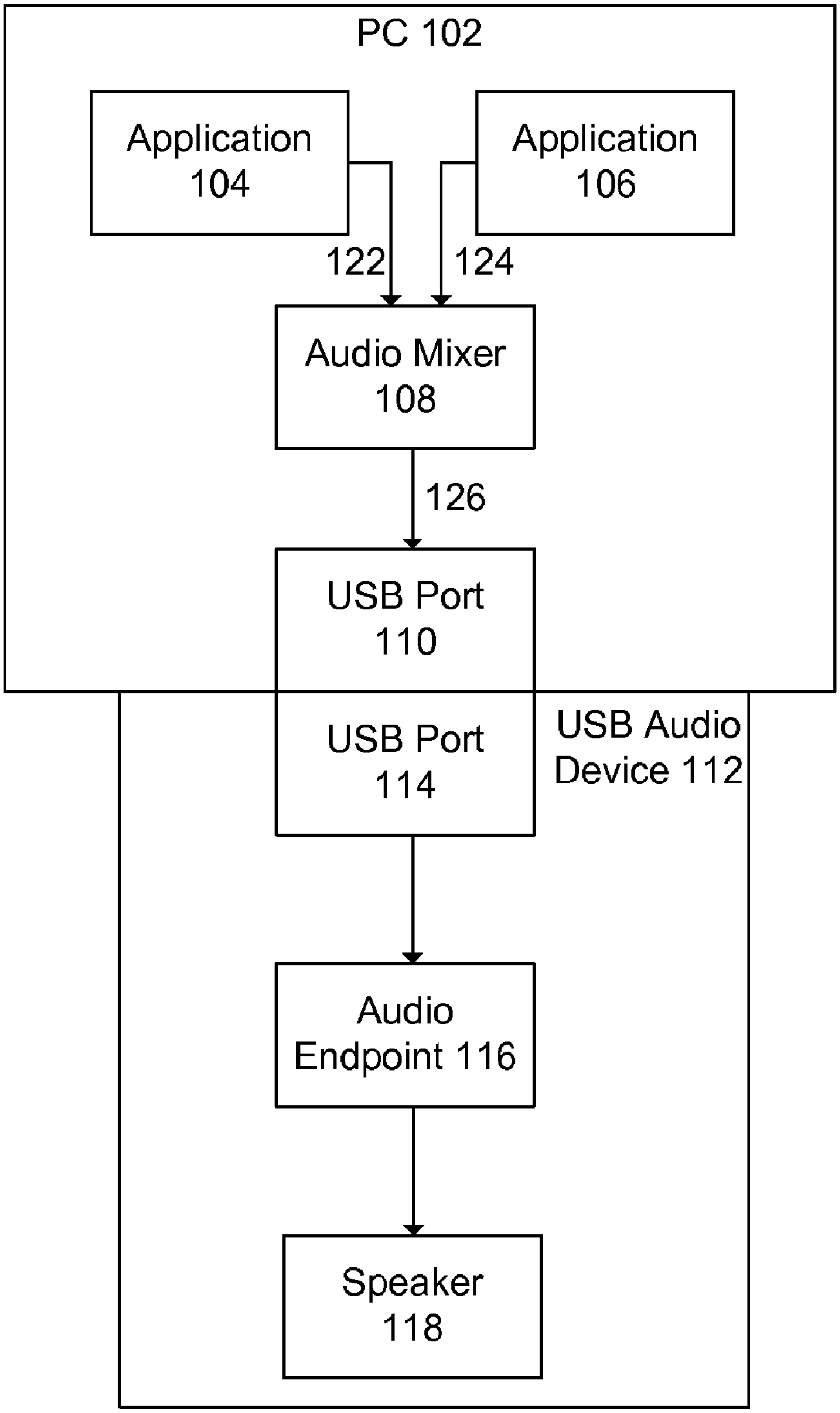
FIG. 1 (Prior Art)
FIG. 1 illustrates routing of audio signals in a USB audio device coupled to a personal computer in the prior art.

In the example shown in FIG. 1, during the enumeration process, USB audio device 112 declares a USB audio endpoint 116 corresponding to an output audio transducer at the USB audio device 112 such as speaker 118. Speaker 118 may be replaced with a speaker pair to output a stereo audio signal. Thus, only a single USB audio endpoint is declared for the speaker or speaker pair. A second USB audio endpoint may also be declared corresponding to an input audio transducer associated with the USB audio device 112 such as a microphone (not shown). During the enumeration process, following declaration of USB audio endpoint 116, at PC 102 an audio mixer 108 is assigned to USB audio endpoint 116 in a 1 to 1 mapping. Where a second USB audio endpoint is declared, at PC 102 a second audio mixer is assigned to the second USB audio endpoint in a 1 to 1 mapping, and so forth.

As a result, only a single audio mixer is assigned at the PC 102 to output audio to the USB audio device 112 at speaker 118 via a USB audio endpoint 116. Thus any applications executed on PC 102 sending audio to USB audio device 112 must route audio through audio mixer 108. For example, if both application 104 and application 106 both output audio simultaneously, audio mixer 108 receives an audio signal 122 from application 104 and receives an audio signal 124 from application 106. Audio mixer 108 outputs a mixed audio signal 126 composed of both the audio signal 122 and audio signal 124, where the mixed audio signal 126 is sent to USB audio endpoint 116 at USB audio device 112. Mixed audio signal 126 is then output at speaker 118 so that the listener at speaker 118 simultaneously hears audio from both the applications 104 and application 106 simultaneously. Mixed audio signal 126 may also contain audio from other applications outputting audio on PC 102, including audio from the operating system of PC 102.

The prior art configuration may be undesirable where the user of USB audio device 112 does not want to hear audio from both the application 104 and application 106 simultaneously. For example, where application 104 is a VoIP telephony application and voice communications are being output at speaker 118, the user may not wish to hear audio from application 106 during the VoIP call. Similarly, where application 106 is a media player currently outputting music at speaker 118, the user may not wish to continue hearing music if a VoIP application becomes active and sends voice communications to speaker 118.

In one example of the invention, a number of USB audio endpoints at a USB audio device are declared for a single transducer set. The number of USB audio endpoints declared during the USB audio device enumeration may be predetermined in advance. A processor based host such as a personal computer (PC) views each declared USB audio endpoint, a digital construct within the USB topology that relates to an audio transducer, as a distinct audio endpoint. This enables the user to configure PC applications and the PC operating system to handle audio streams differently. Each application is allocated a USB audio endpoint to stream audio to. This enables the audio streams to be maintained independently as they are passed to the USB audio device from the PC. The USB audio device is then able to prioritize the USB audio endpoints, and determine which audio stream or streams should be routed to the transducer set.

In practice, multiple declared USB audio endpoints are required to instantiate multiple audio mixers at the PC, which are required to keep the output audio signals from multiple host applications separate and distinct. The PC generates a number of audio mixers corresponding to the number of declared USB audio endpoints. Each PC application can be configured to use a particular audio mixer. Each particular audio mixer can mix audio from multiple applications, though a mixer may also be configured to receive audio from only a single application. Since each host application can be configured to use a different audio mixer, and since there is a 1 to 1 relationship between audio mixers and USB audio endpoints, each host application can therefore be tied a particular USB audio endpoint and audio isolation between different applications can be effected.

In one example use scenario, a user is listening to music from a PC media player application using a USB headset, and then attempts to establish a telephone call using a PC based softphone. If the media player is not paused by the user, the PC will continue to stream the media player audio to a first USB audio endpoint. It will also begin streaming softphone audio to a second, different USB audio endpoint. The two audio streams will remain independent since multiple audio endpoints have been declared for the single transducer set at the headset (the headset speakers). At the USB headset, an intelligent audio router application will then determine that the softphone audio has a higher priority than the music audio, and route the softphone audio to the transducer set. The media player audio will be discarded. Any audio from another source, such as the operating system or an email/calendaring application, can also be discarded in this manner.

In one example, a USB based Bluetooth dongle device is described. The USB Bluetooth dongle is either HCI based, requiring a PC based Bluetooth stack, or is an embedded stack implementation. The USB Bluetooth dongle provides for audio transfer between a PC and a Bluetooth headset for either telephony, high-fidelity stereo, or both. The Bluetooth controller selects the audio type output to the Bluetooth headset based on the active Bluetooth profile being used. SCO audio is used whenever the headset Profile or Handsfree Profile is active, and SBC encoded audio is used whenever the Advanced Audio Distribution Profile (A2DP) is the active profile.

In this example, multiple USB audio endpoints are declared to handle the telephony audio and the high quality stereo audio separately. One USB audio endpoint associated with the Bluetooth headset microphone is declared as an input (to the PC) endpoint, and is used to send audio from the headset to the PC via the USB Bluetooth dongle. One USB audio endpoint is defined as a mono output (from the PC) endpoint, and is used to send mono audio from the PC to the headset via the USB Bluetooth dongle. This endpoint will be used for the telephony SCO audio. One USB audio endpoint is declared as a stereo output (from the PC) endpoint, and is used to send stereo audio from the PC to the headset via the USB Bluetooth dongle. This endpoint will be used for the stereo SBC encoded A2DP audio.

In this example, by defining the three audio endpoints, the two different output audio endpoints can be each assigned to particular applications within the PC, thus enabling one of the audio output endpoints to be assigned to Softphone type applications, which require the use of SCO audio, and the second audio output endpoint to be assigned to all other PC audio applications.

The USB Bluetooth dongle prioritizes telephony audio over high quality stereo audio, such that any pre-existing SBC encoded A2DP audio between the USB Bluetooth dongle and the headset is placed in a suspended state whenever SCO audio is required to be transferred between the USB Bluetooth dongle and the headset. The USB Bluetooth dongle determines whether any audio is required by monitoring the incoming audio from both the output audio endpoints. If audio is present on only one of the output audio endpoints, then the appropriate audio transfer mechanism is established. Thus, if the incoming audio corresponds to telephony audio, then a SCO channel will be established between the USB Bluetooth dongle and the headset. Similarly, if the incoming audio corresponds to high quality stereo audio, then an SBC encoded A2DP audio channel will be established between the USB Bluetooth dongle and the headset.

If audio is detected on both output audio endpoints, then the telephony audio is deemed to have the higher priority. In this case, the SBC encoded A2DP audio will be suspended, and a SCO channel will be established between the USB Bluetooth dongle and the headset. Thus, the telephony experience of the user is improved by preventing other audio events from being output to the user ear from the PC. Although certain examples are described herein with respect to USB based Bluetooth devices, in further examples isolation between telephony audio and non-telephony audio is provided by non-Bluetooth based USB audio devices.

In one example, a computer readable storage medium storing instructions that when executed by a computer cause the computer to perform a method for contextual audio switching for a USB controlled audio device coupled to a processor-based host. The method performed includes declaring two or more USB audio endpoints associated with a singular output audio transducer or transducer set at the USB controlled audio device. The two or more USB audio endpoints are monitored to identify an audio signal presence at the two or more USB audio endpoints, where each USB audio endpoint is associated with an audio mixer at the processor-based host in a one-to-one relationship. The method further includes determining a priority audio signal responsive to identifying the audio signal presence at two or more USB audio endpoints, and routing only the priority audio signal to the singular output audio transducer.

In one example, a USB controlled audio device includes a USB dongle and a wireless device. The wireless device includes an output audio transducer or transducer set and a first wireless communications module. The USB dongle includes a USB port, a processor, and a second wireless communications module operable to establish wireless communications with the wireless device. The USB dongle further includes a computer readable memory storing instructions that when executed by the processor cause the processor to declare two or more output USB audio endpoints at the USB controlled audio device associated with the output audio transducer or transducer set, determine a priority audio signal responsive to identifying an output audio signal presence at two or more output USB audio endpoints, and wirelessly transmit only the priority audio signal to the wireless device for output at the output audio transducer or transducer set.

In one example, a computer readable storage medium storing instructions that when executed by a computer cause the computer to perform a method for contextual audio switching for a USB controlled audio device. The method performed includes declaring an input USB audio endpoint associated with a wireless headset microphone. The method includes declaring a first output USB audio endpoint associated with a wireless headset speaker to receive a first audio signal from a processor-based host, the first audio signal comprising a telephony signal, and declaring a second output USB audio endpoint associated with the wireless headset speaker to receive a second audio signal from the processor-based host. The first output USB audio endpoint and the second output USB audio endpoint are monitored to identify a presence of the first audio signal, the second audio signal, or both the first audio signal and the second audio signal. The first audio signal is transmitted to the wireless headset speaker responsive to identifying the presence of the first audio signal or identifying the presence of both the first audio signal and the second audio signal. The first audio signal and/or the second audio signal may also be routed to a second wireless headset speaker in addition to the first wireless headset speaker.

Figure 2:
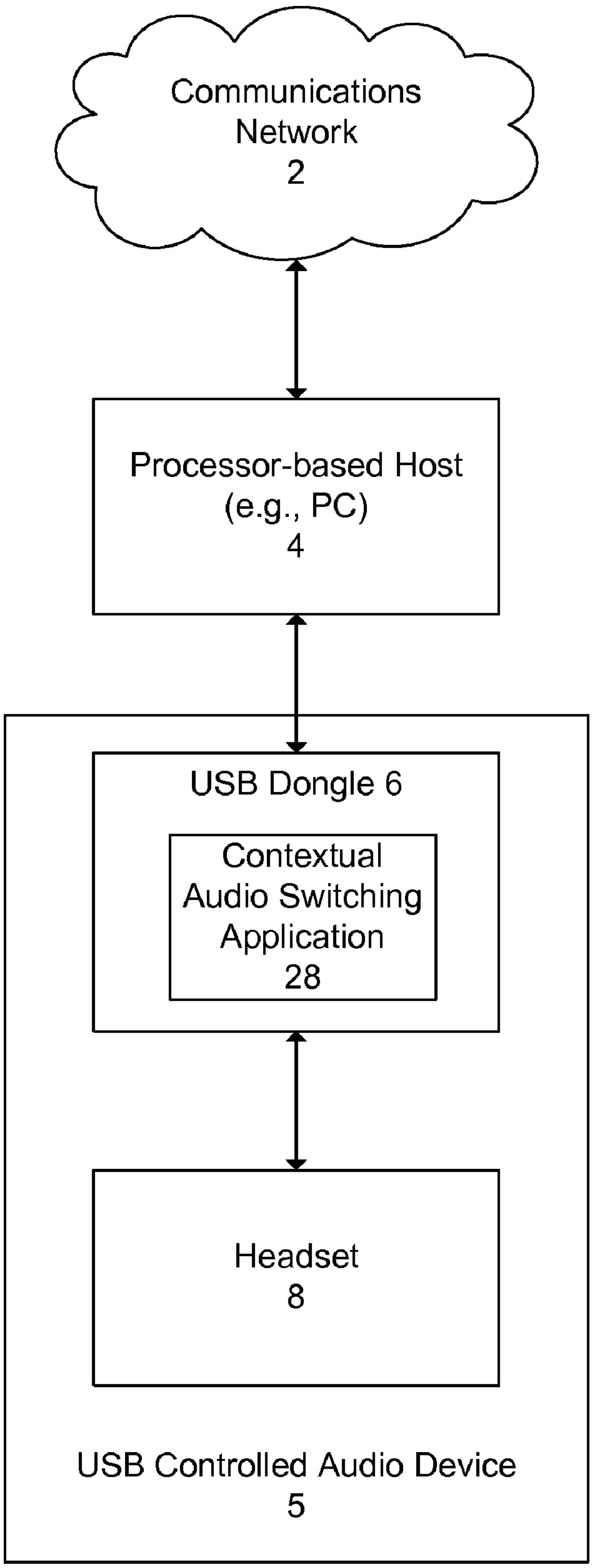
FIG. 2 illustrates a system diagram including a USB audio device executing a contextual audio switching application in one example.

FIG. 2 illustrates a system diagram including a USB controlled audio device system 5 (also referred to herein simply as a USB audio device) comprising a USB dongle 6 executing a contextual audio switching application 28 and an associated headset 8. Communication between the USB dongle 6 and its associated headset 8 may occur via either a wired or wireless connection. The term "connection" utilized herein generally refers to both wired and wireless connections. The USB controlled audio device system 5 is in communication with a processor-based host 4 via a connection to a Universal Serial Bus (USB) port provided on the processor-based host 4. The term "dongle" as used herein refers to any USB device capable of communications with process-based host 4 via a connection to a USB port provided on the processor-based host 4.

Processor-based host 4 may generally be any suitable processor-based device such as a personal computer (PC), notebook computer, mobile phone, or smartphone. In further examples, processor-based host 4 can be, without limitation, a personal digital assistant (PDA), digital music player, video player, and any processor based telephone. In the example shown in FIG. 2, the processor-based host 4 is connected to a communications network 2 for receiving incoming and sending outgoing communication calls.

For example, communications network 2 may be the Internet, an intranet network, or a LAN. Although not shown, the communications network 2 may be in communication with other networks including, for example, a public switched telephone network (PSTN) or a Private Branch Exchange for completing a communication call on a remote end to a remote recipient or remote caller. In further examples, the USB dongle 6 executing a contextual audio switching application 28 and its associated headset 8 may be integrated as a single component whereby the audio transducing functions performed by the headset 8 are incorporated into a USB dongle executing a contextual audio switching application 28.

Figure 3:
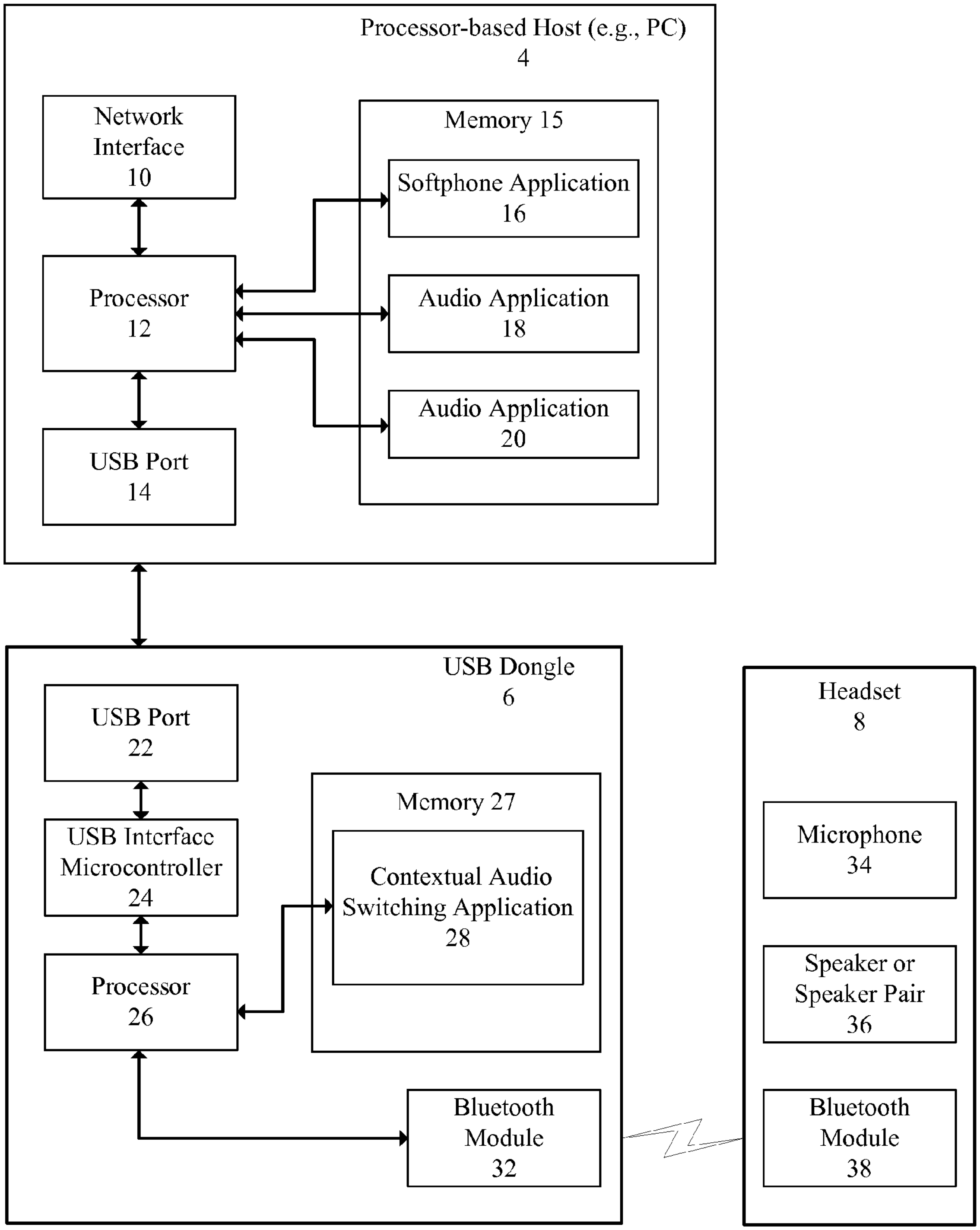
FIG. 3 illustrates a simplified block diagram of the system shown in FIG. 2.

FIG. 3 illustrates a simplified block diagram of the system shown in FIG. 2 in further detail in one example. As shown in FIG. 3, processor-based host 4 includes a processor 12 which controls hardware and executes application software or firmware residing on computer-readable memory on the host. For example, the processor 12 executes software or firmware applications such as a softphone application 16, audio application 18, and audio application 20 residing in computer readable memory 15. The number of audio applications shown is for illustration only, and any number of audio applications may reside on the processor-based host 4. For example, computer readable memory 15 may be a RAM device or ROM device. Alternatively, softphone application 16, audio application 18, and audio application 20 may reside on any other computer readable storage media that can store data readable by a computer system. Examples of computer readable storage media include hard disks, optical media, and specially configured hardware devices such as application-specific integrated circuits (ASICs) and programmable logic devices (PLDs).

The term "audio application" as used herein refers to any application which may output audio signals or receive as input audio signals. The softphone application 16 is a specific instantiation of an audio application. The term softphone application generally refers to a telephony application running on a PC or other processor-based host, and may also be referred to as a VoIP telephony application. Other examples of audio applications include media player applications (e.g., Microsoft Windows Media Player), calendaring and email applications (e.g., Microsoft Outlook), and host operating systems (e.g., Microsoft Vista), and voice recognition applications. Processor-based host 4 includes a network interface 10 for connection to communications network 2 shown in FIG. 2. Processor-based host 4 includes a USB port 14 for mating to a corresponding USB port 22 on USB dongle 6.

USB dongle 6 includes a processor 26, USB interface microcontroller 24, and a wireless communications module operable to establish wireless communications with a wireless headset 8. In the example shown in FIG. 2, the wireless communications module is a Bluetooth module 32. Wireless headset 8 has audio transducers including a microphone 34 and a speaker or speaker pair 36.

The USB dongle 6 further includes a computer readable memory 27 storing a contextual audio switching application 28 performing functions described herein. Contextual audio switching application 28 includes instructions that when executed by the processor 26 cause the processor 26 to declare two or more output USB audio endpoints to be associated with the speaker or speaker pair 36, determine a priority audio signal responsive to identifying an output audio signal presence at the two or more output USB audio endpoints, and transmit only the priority audio signal using the Bluetooth module 32 to the wireless headset 8 for output at the speaker or speaker pair 36. In one example, the two or more output USB audio endpoints declared by contextual audio switching application 28 include a first output USB audio endpoint to receive telephony SCO audio and a second output USB audio endpoint to receive stereo SBC encoded A2DP audio.

In one example, the contextual audio switching application 28 includes instructions to switch from transmitting a current audio signal to the headset 8 to transmit the priority audio signal to the headset 8. The contextual audio switching application 28 is operable to switch from a Bluetooth audio A2DP channel to a Bluetooth audio SCO channel between the USB dongle 6 and the headset 8 to transmit the priority audio signal. In one example, the contextual audio switching application 28 includes instructions to declare an input USB audio endpoint to receive an input audio signal from the microphone 34 at headset 8.

Figure 4:
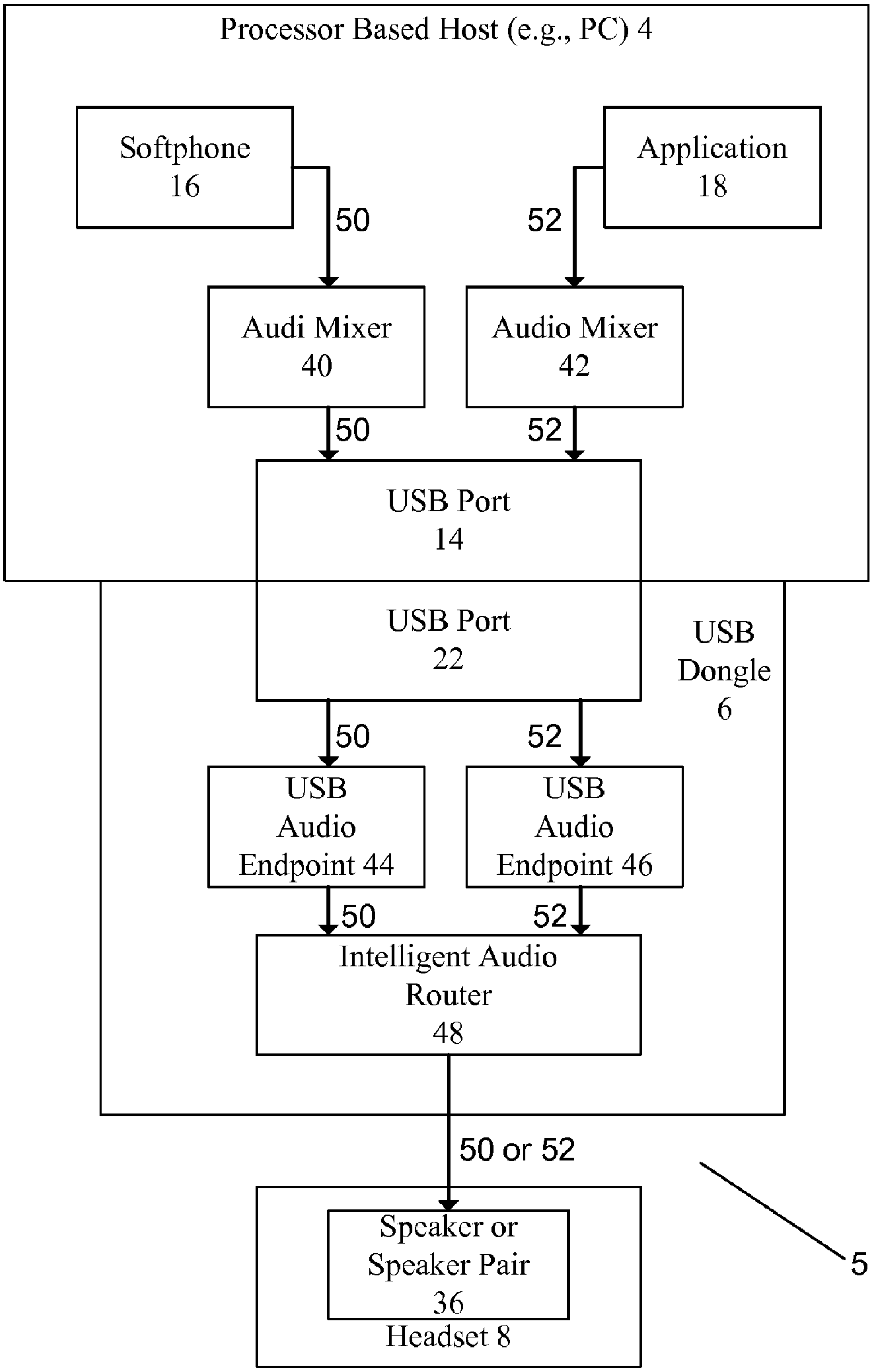
FIG. 4 illustrates routing and switching of audio signals in one example of the invention.

FIG. 4 illustrates routing of audio signals in the USB audio device 5 coupled to processor-based host 4 in one example. The USB dongle 6 having a USB port 22 is coupled to processor-based host 4 having a USB port 14. When the USB port 22 is mated with the USB port 14, enumeration of USB audio device 5 occurs. During the enumeration process, the USB audio device 5 defines a series of its capabilities, including its number of USB audio endpoints. In the present example, multiple USB audio endpoints are declared for a singular audio transducer or singular transducer set at USB audio device 5. For example, a USB audio device 5 having a singular audio transducer consisting of a microphone and a singular audio transducer set consisting of a speaker pair may declare one USB audio endpoint for the microphone and more than one USB audio endpoint for the speaker pair during enumeration. In an example where the USB audio device has only a single mono speaker instead of a stereo speaker pair, two or more USB audio endpoints may be declared for the mono speaker. In further example, the output audio transducer set may consist of more than two speakers, such as that in a USB audio device having surround sound capabilities.

In the example shown in FIG. 4, during the enumeration process, USB audio device 5 declares both a USB audio endpoint 44 and a USB audio endpoint 46 corresponding to an output audio transducer consisting of speaker or speaker pair 36 at headset 8. An additional USB audio endpoint is declared corresponding to an input audio transducer consisting of microphone 34 at headset 8 (not shown). During the enumeration process, following declaration of USB audio endpoint 44, at processor-based host 4 an audio mixer 40 is assigned to USB audio endpoint 44 in a 1 to 1 mapping. Following declaration of USB audio endpoint 46, at processor-based host 4 an audio mixer 42 is assigned to USB audio endpoint 46 in a 1 to 1 mapping.

As a result, in the present example, multiple audio mixers are assigned at the processor-based host 4 to output audio to the speaker or speaker pair 36 via multiple USB audio endpoints at the USB audio device 5. Thus, applications executed on processor-based host 4 sending audio to USB audio device 5 may route audio through different audio mixers, allowing audio signals from different applications to remain unmixed.

In the example, shown in FIG. 4, audio mixer 40 receives a telephony audio signal 50 from softphone application 16, and audio mixer 42 receives an audio signal 52 from application 18. Audio mixer 40 outputs telephony audio signal 50 to USB audio endpoint 44 and audio mixer 42 outputs audio signal 52 to USB audio endpoint 46. In this manner, where softphone application 16 and application 18 simultaneously output telephony audio signal 50 and audio signal 52, telephony audio signal 50 and audio signal 52 are both received at USB audio device 5 unmixed.

Intelligent audio router 48, controlled by contextual audio switching application 28 operates to route audio signals at the USB audio endpoints 44, 46 to speaker or speaker pair 36. Depending upon the logic of intelligent audio router 48, either telephony audio signal 50 or audio signal 52 is output. For example, where a telephony audio signal 50 is present at USB audio endpoint 44, telephony audio signal 50 and only telephony audio signal 50 is output at speaker or speaker pair 36 regardless of the presence of audio signal 52 at USB audio endpoint 46. Where only an audio signal 52 is present at USB audio endpoint 46, intelligent audio router 48 outputs audio signal 52 at speaker or speaker pair 36. In this example, where only audio signal 52 is present and is being output at speaker or speaker pair 36, if a telephony audio signal 50 is newly detected at USB audio endpoint 44 as the result of an incoming call, intelligent audio router 48 switches the output to speaker or speaker pair 36 from audio signal 52 to telephony audio signal 50.

In this manner, a user engaged in telephony voice communications using softphone application 16 does not hear undesired audio from other audio applications running on the processor-based host. In further examples, audio from select audio applications may be mixed with audio signal 52 and heard while audio from other applications may not be mixed.

Figure 5:
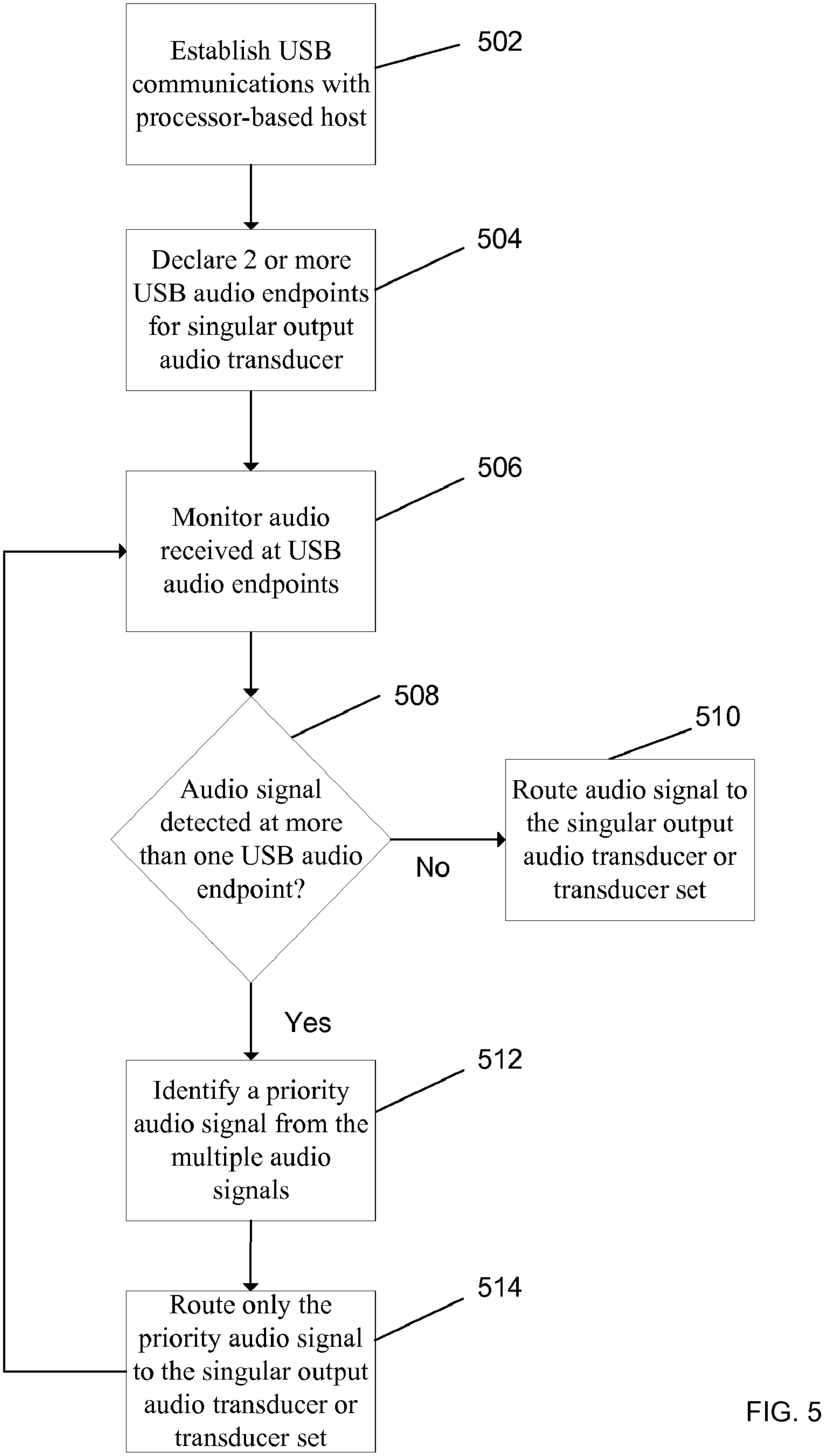
FIG. 5 is a flow diagram illustrating contextual audio switching in a USB controlled audio device in one example.

FIG. 5 is a flow diagram illustrating contextual audio switching in a USB controlled audio device in one example. At block 502, USB communications are established between the USB controlled audio device and the processor-based host. The USB communications may be established during enumeration of the USB controlled audio device when connected to the processor-based host. At block 504, two or more USB audio endpoints are declared at the USB controlled audio device, whereby the two or more USB audio endpoints are associated with a singular output audio transducer or transducer set. For example, the singular output audio transducer or transducer set may be a speaker or stereo speaker pair.

Each declared USB audio endpoint is associated with a corresponding audio mixer assigned at the processor-based host responsive to the USB audio endpoint declaration, whereby an audio signal is transmitted from an audio mixer to an associated USB audio endpoint. At the processor-based host, a given audio application outputs its audio signal to a given audio mixer. In one example, a particular host audio application is allocated to a declared USB audio endpoint via a given audio mixer so that it may be determined by the USB controlled audio device whether the particular host audio application is outputting an audio signal by monitoring the declared USB audio endpoint. For example, the host audio application may be a VoIP telephony application, a media player application, a host operating system, or any other application outputting audio to the user or receiving audio from the user.

At block 506, the two or more USB audio endpoints are monitored to identify an audio signal presence at each USB audio endpoint. At decision block 508, it is determined whether an audio signal is detected at more than one USB audio endpoint. If no at decision block 508, at block 510, the detected single audio signal is routed to the singular output audio transducer or transducer set. If yes at decision block 508, at block 512 a priority audio signal is determined responsive to identifying the audio signal presence at two or more USB audio endpoints. At block 514, only the priority audio signal is routed to the singular output audio transducer or transducer set at the USB controlled audio device. For example, routing only the priority audio signal to the singular output audio transducer or transducer set may involve wirelessly transmitting the priority audio signal to a wireless headset for output at the singular output audio transducer or transducer set. Following block 514, the process returns to block 506.

In one example, a telephony audio signal is deemed to be the priority audio signal if present. Thus, if a non-telephony audio signal is presently being output at the singular output audio transducer or transducer set, routing only the priority audio signal to the singular output audio transducer or transducer set at block 512 will require switching the output to the singular output audio transducer or transducer set from the present non-telephony audio signal to the telephony (i.e. priority) audio signal.

In one example, the USB controlled audio device is a USB Bluetooth dongle paired with an associated Bluetooth headset. In this example, at block 504 when two or more USB audio endpoints are declared, a first USB audio endpoint is declared to receive telephony SCO audio for transmission from the USB dongle to a wireless headset using the Bluetooth protocol. A second USB audio endpoint is declared to receive Stereo SBC encoded A2DP audio for transmission from the USB dongle to the wireless headset using the Bluetooth protocol. In this example, at block 514, routing only the priority audio signal to the singular output audio transducer or transducer set involves switching from a Bluetooth audio A2DP channel to a Bluetooth audio SCO channel between the USB Bluetooth dongle and the Bluetooth headset.

In one example, at block 504 when two or more USB audio endpoints are declared at the USB controlled audio device, (1) an input USB audio endpoint is declared to receive an audio signal from an input audio transducer to be transmitted to the processor-based host, (2) a first output USB audio endpoint is declared to receive a mono audio signal from the processor-based host to be transmitted to the singular output audio transducer or transducer set, and (3) a second output USB audio endpoint is declared to receive a stereo audio signal from the processor-based host to be transmitted to the singular output audio transducer or transducer set.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: the type of communication network used by the softphone, standards to perform the VoIP call setup, signaling, and control; wireless protocols used by the USB audio device, types of USB audio devices, including speakerphones; routing/switching logic used by the intelligent audio router and contextual audio switching application. For example, the communications network used may be a PSTN, a public or private data network, wireline or wireless network, or the Internet. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

Those skilled in the art will appreciate that the reference to the terms "VoIP" and "VoIP telephone" are used in the generic sense to include any "voice-over-packet" technique or device, without limitation to a specific standard.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A non-transitory computer readable storage memory storing instructions that when executed by a computer cause the computer to perform a method for contextual audio switching for a USB controlled audio device coupled to a processor-based host comprising:

declaring two or more USB audio endpoints associated with a singular output audio transducer or transducer set at the USB controlled audio device;

monitoring the two or more USB audio endpoints to identify an audio signal presence at the two or more USB audio endpoints, wherein each USB audio endpoint is associated with an audio mixer at the processor-based host in a one-to-one relationship;

determining a priority audio signal responsive to identifying the audio signal presence at two or more USB audio endpoints; and routing only the priority audio signal to the singular output audio transducer or transducer set.

2. The non-transitory computer readable storage memory of claim 1, wherein routing only the priority audio signal to the singular output audio transducer or transducer set comprises switching from a first audio signal currently output at the singular output audio transducer or transducer set to the priority audio signal.

3. The computer readable storage medium of claim 1, wherein the USB controlled audio device comprises a USB Bluetooth dongle and an associated Bluetooth headset, and wherein declaring two or more USB audio endpoints at the USB controlled audio device comprises:

declaring a first USB audio endpoint to receive telephony SCO audio for transmission from the USB Bluetooth dongle to the associated Bluetooth headset; and declaring a second USB audio endpoint to receive Stereo SBC encoded A2DP audio for transmission from the USB Bluetooth dongle to the associated Bluetooth headset.

4. The non-transitory computer readable storage memory of claim 1, wherein the singular output audio transducer or transducer set is a single speaker or a stereo speaker pair.

5. The non-transitory computer readable storage memory of claim 1, wherein routing only the priority audio signal to the singular output audio transducer or transducer set comprises wirelessly transmitting the priority audio signal to a wireless headset comprising the singular output audio transducer or transducer set.

6. The non-transitory computer readable storage memory of claim 1, further comprising instructions for allocating a host audio application residing on the processor-based host to a declared USB audio endpoint.

7. The non-transitory computer readable storage memory of claim 6, wherein the host audio application is selected from the group consisting of a VoIP telephony application, a media player application, and a host operating system.

8. The non-transitory computer readable storage memory of claim 1, wherein the processor-based host comprises a personal computer and the USB controlled audio device comprises a USB Bluetooth dongle and an associated Bluetooth headset.

9. The non-transitory computer readable storage memory of claim 1, wherein declaring two or more USB audio endpoints at the USB controlled audio device comprises:

declaring an input USB audio endpoint to receive an audio signal from an input audio transducer or transducer set to be transmitted to the processor-based host;

declaring a first output USB audio endpoint to receive a mono audio signal from the processor-based host to be transmitted to the singular output audio transducer or transducer set;

declaring a second output USB audio endpoint to receive a stereo audio signal from the processor-based host to be transmitted to the singular output audio transducer or transducer set.

10. The computer readable storage medium of claim 1, wherein routing only the priority audio signal to the singular output audio transducer or transducer set comprises switching from a Bluetooth audio A2DP channel to a Bluetooth audio SCO channel with a Bluetooth device comprising the singular output audio transducer or transducer set.

11. The non-transitory computer readable storage memory of claim 1, wherein the priority audio signal is a telephony signal.

12. A USB controlled audio device comprising:

a wireless device comprising:

an output audio transducer or transducer set; and a first wireless communications module;

a USB dongle comprising:

a USB port;

a processor;

a second wireless communications module, the second wireless communications module operable to establish wireless communications with the wireless device;

a non-transitory computer readable storage memory storing instructions that when executed by the processor cause the processor to declare two or more output USB audio endpoints at the USB controlled audio device associated with the output audio transducer or transducer set, determine a priority audio signal responsive to identifying an output audio signal presence at two or more output USB audio endpoints, and wirelessly transmit only the priority audio signal to the wireless device for output at the output audio transducer or transducer set.

13. The USB controlled audio device of claim 12, the non-transitory computer readable storage memory storing further instructions to switch from transmitting a current audio signal to the wireless device to transmit the priority audio signal to the wireless device.

14. The USB controlled audio device of claim 12, wherein the first wireless communications module and the second wireless communications module are Bluetooth modules, and wherein the two or more output USB audio endpoints declared comprise a first output USB audio endpoint to receive telephony SCO audio and a second output USB audio endpoint to receive stereo SBC encoded A2DP audio.

15. The USB controlled audio device of claim 12, wherein the wireless device further comprises a microphone and wherein the non-transitory computer readable storage memory stores further instructions to declare an input USB audio endpoint to receive an input audio signal from the microphone.

16. The USB controlled audio device of claim 12, wherein the wireless device comprises a Bluetooth headset and the computer readable memory stores further instructions to switch from a Bluetooth audio A2DP channel to a Bluetooth audio SCO channel between the USB dongle and the Bluetooth headset to transmit the priority audio signal.

17. The USB controlled audio device of claim 12, wherein the output audio transducer or transducer set is a single speaker or a stereo speaker pair.

18. A non-transitory computer readable storage memory storing instructions that when executed by a computer cause the computer to perform a method for contextual audio switching for a USB controlled audio device comprising:

declaring an input USB audio endpoint associated with a wireless headset microphone;

declaring a first output USB audio endpoint associated with a wireless headset speaker to receive a first audio signal from a processor-based host, the first audio signal comprising a telephony signal;

declaring a second output USB audio endpoint associated with the wireless headset speaker to receive a second audio signal from the processor-based host;

monitoring the first output USB audio endpoint and the second output USB audio endpoint to identify a presence of the first audio signal, the second audio signal, or both the first audio signal and the second audio signal;

transmitting the first audio signal to the wireless headset speaker responsive to identifying the presence of the first audio signal or identifying the presence of both the first audio signal and the second audio signal.

19. The computer readable storage medium of claim 18, wherein transmitting the first audio signal to the wireless headset speaker comprises switching from a Bluetooth audio A2DP channel to a Bluetooth audio SCO channel.

20. The non-transitory computer readable storage memory of claim 18, wherein the first output USB audio endpoint is associated with a first output audio mixer at the processor-based host and the second output USB audio endpoint is associated with a second output audio mixer at the processor-based host.

21. The non-transitory computer readable storage memory of claim 20, wherein the first output audio mixer at the processor-based host receives a telephony signal from a VoIP telephony application.

* * * * *